117,746

UNITED STATES PATENT OFFICE.

JOHN W. CORNELL, OF LAWN RIDGE, ILLINOIS.

IMPROVEMENT IN CORN-STALK CUTTERS.

Specification forming part of Letters Patent No. 117,746, dated August 8, 1871.

*To all whom it may concern:*

Be it known that I, JOHN W. CORNELL, of Lawn Ridge, in the county of Marshall and in the State of Illinois, have invented a new and Improved Corn-Stalk Cutter; and do hereby declare that the following is a full, clear, and exact description thereof, reference being had to the annexed drawing making a part of this specification, in which like letters of reference refer to like parts, and in which—

Figure 1:
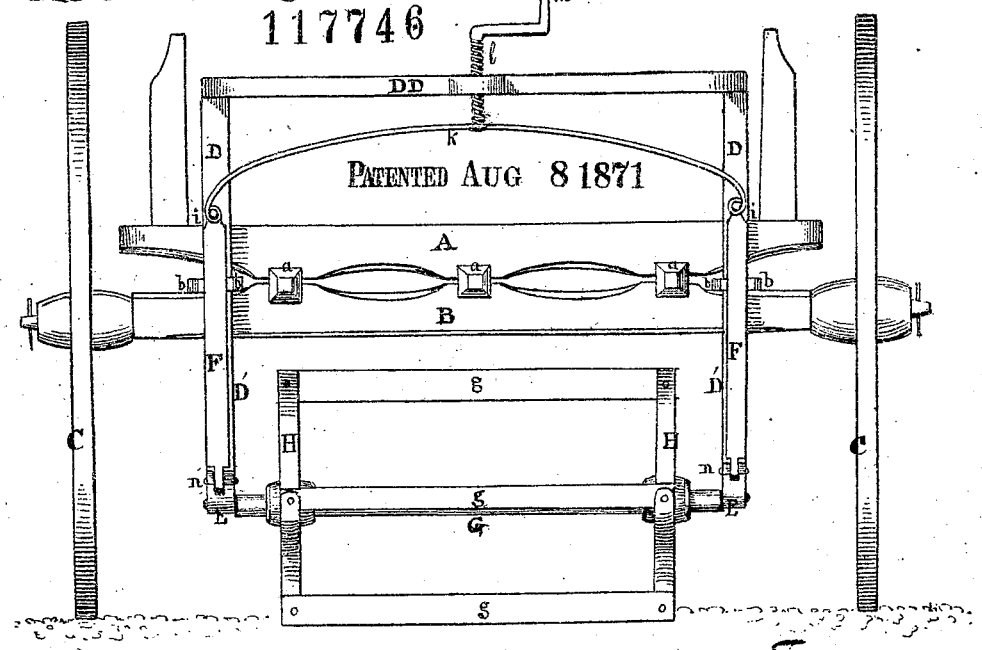
Figure 2:
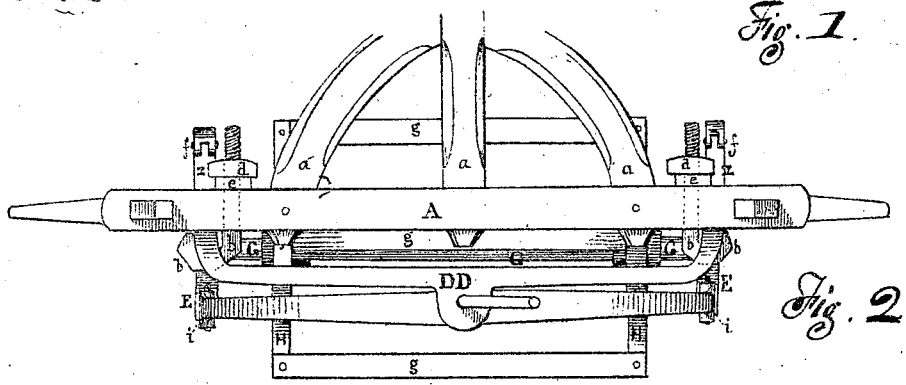
Figure 3:
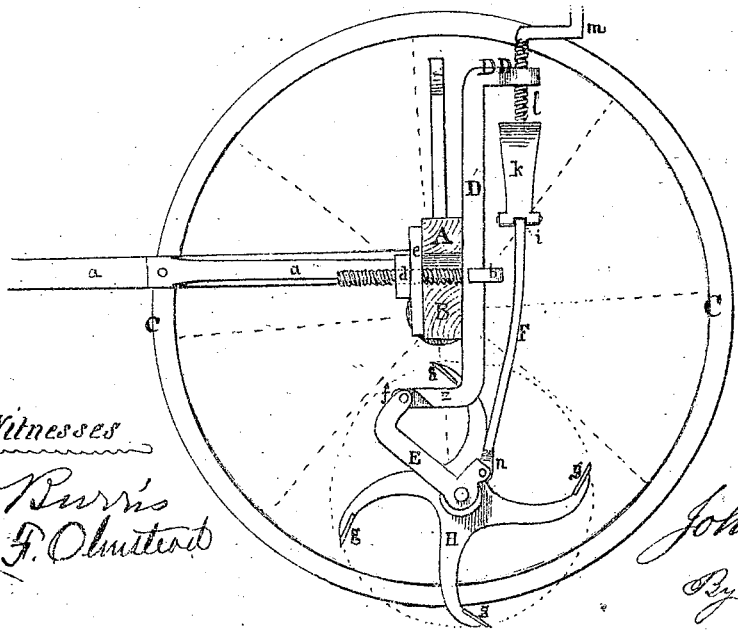

Figure 1 represents an end view; Fig. 2, a plan view; and Fig. 3, a side elevation.

This invention consists in mounting the axle of the rotary cutter on a short lever at either end, which is pivoted to an upright frame attached to the axle of a wagon, the cutter being elevated or depressed to the proper point for the effective working of the blades by an auxiliary rod, spring, and screw, connecting the cutter suitably with the frame, the whole arranged as will be hereinafter more fully explained.

To enable others skilled in the art to make and use my invention, I will proceed to describe its construction and operation.

A represents the bolster, B the axle, and C C the wheels of a wagon. D is the upright frame, consisting of two upright pieces united at the top by a cross-piece, D D. The uprights D are clamped to the axle and bolster by means of the hook or clamp $b$, the latter having a screw at the other end which passes through a plate, $e$, and nut $d$, behind the axle and bolster, by which means the frame D–D D can be raised or lowered. E E are levers pivoted to the bent portion Z of either of the uprights D, said levers carrying at their ends the ends of the axle of the cutter. This end of each of the levers E E is pivoted to one of the two connecting-rods F F, at $n$, the upper parts of each of the latter being attached to one end, $i$, and operated by the elliptical spring $k$, which is sustained by the screw $l$ working in the cross-piece D D above. G is the axle of the cutter. H H are its arms, which carry the usual beveled blades $g\ g\ g\ g$, slightly inclined from a horizontal position.

The operation of this machine is as follows: The machine is drawn over the field in which the stalks are lying, the cutting of them effectually being managed by the winch $m$, screw $l$, and spring $k$, connected by the rod F with the lever E which carries the cutter. The lever E, being hung at $f$ to the lower ends of the frame D, permits a nice adjustment of the cutter to the proper effective stroke of the same. The spring $k$ obviates the jar communicated by inequalities of the ground to the machine, and keeps the cutter from being stopped by the same.

Having thus fully described my invention, what I claim therein as new, and desire to secure by Letters Patent, is—

The upright frame D, constructed as described, with hinged levers E E for carrying the rotary cutter, screw $l$ and spring $k$, connected by rods F F with the said levers, the said frame being attached to the axle of a wagon, substantially as set forth.

In testimony that I claim the foregoing cornstalk cutter I have hereunto set my hand this 22d day of September, 1870.

JOHN W. CORNELL.

Witnesses:
HENRY W. WELLS,
EDMUND THURLOW.